United States Patent
Rachow

(10) Patent No.: US 12,533,683 B2
(45) Date of Patent: Jan. 27, 2026

(54) BLENDED JET SPRAY NOZZLE

(71) Applicant: A. RAYMOND ET CIE, Grenoble (FR)

(72) Inventor: Larry M. Rachow, Lenox, MI (US)

(73) Assignee: A. RAYMOND ET CIE, Grenoble (FR)

( * ) Notice: Subject to any disclaimer, the term of this patent is extended or adjusted under 35 U.S.C. 154(b) by 323 days.

(21) Appl. No.: 18/127,266

(22) Filed: Mar. 28, 2023

(65) Prior Publication Data
US 2023/0311134 A1 Oct. 5, 2023

Related U.S. Application Data

(60) Provisional application No. 63/324,696, filed on Mar. 29, 2022.

(51) Int. Cl.
*B05B 1/04* (2006.01)
*B60S 1/56* (2006.01)
*B60S 1/52* (2006.01)

(52) U.S. Cl.
CPC .............. *B05B 1/046* (2013.01); *B60S 1/52* (2013.01); *B60S 1/56* (2013.01)

(58) Field of Classification Search
CPC ........ B05B 1/046; B05B 7/08; B05B 1/1609; B05B 1/1636; B60S 1/52; B60S 1/56; B60S 1/54; B60S 1/0822; B60S 1/481; F02K 1/40; B62D 25/06
See application file for complete search history.

(56) References Cited

U.S. PATENT DOCUMENTS

| | | | |
|---|---|---|---|
| 4,193,550 A | 3/1980 | Juttelstad et al. |
| 4,480,793 A | 11/1984 | Grande |
| 5,052,756 A | 10/1991 | Wada et al. |
| 5,558,562 A | 9/1996 | Diat |
| 7,726,587 B2 | 6/2010 | Markley et al. |

(Continued)

FOREIGN PATENT DOCUMENTS

| | | |
|---|---|---|
| CN | 110801955 A | 2/2020 |
| CN | 113374595 A | 9/2021 |

(Continued)

OTHER PUBLICATIONS

International Search Report of the International Searching Authority for application No. PCT/IB2023/053143, dated Jul. 13, 2023 (3 pages).

*Primary Examiner* — Steven M Cernoch
(74) *Attorney, Agent, or Firm* — WARNER NORCROSS + JUDD LLP

(57) ABSTRACT

A spray nozzle is provided. The spray nozzle has a head including a face having a nozzle array and an inner channel in fluid communication with the nozzle array. The nozzle array includes a plurality of nozzles. Each nozzle is defined by an interior opening, an exterior opening, and an outlet channel extending therebetween. Each nozzle has a longitudinal axis extending in a direction extending between the interior opening and the exterior opening. The outlet channel is connected to the inner channel at the interior opening. A cross-sectional shape of the outlet channel taken perpendicular to the longitudinal axis varies from the interior opening to the exterior opening.

12 Claims, 4 Drawing Sheets

(56) References Cited

U.S. PATENT DOCUMENTS

| | | | |
|---|---|---|---|
| 2005/0001072 A1* | 1/2005 | Bolus | B05B 1/26 |
| | | | 239/548 |
| 2007/0018013 A1 | 1/2007 | Lasebnick et al. | |
| 2016/0237971 A1 | 8/2016 | Rowan et al. | |
| 2017/0349150 A1 | 12/2017 | Ostergren | |
| 2019/0022689 A1 | 1/2019 | Fritz et al. | |
| 2019/0151865 A1 | 5/2019 | Zhao | |
| 2019/0232923 A1 | 8/2019 | Tokunaka | |
| 2020/0128153 A1 | 4/2020 | Hartranft et al. | |
| 2020/0179967 A1 | 6/2020 | Kraft et al. | |
| 2020/0406274 A1 | 12/2020 | Schulz-Weiling | |

FOREIGN PATENT DOCUMENTS

| | | |
|---|---|---|
| EP | 1238261 B1 | 5/2010 |
| JP | 3801778 B2 | 7/2006 |

* cited by examiner

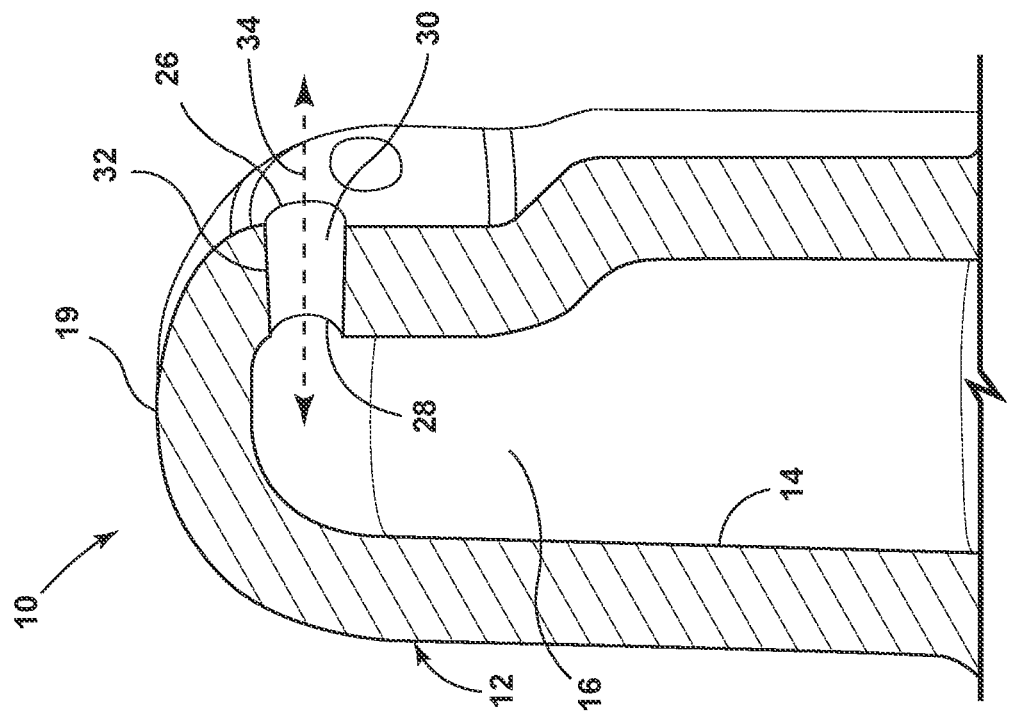
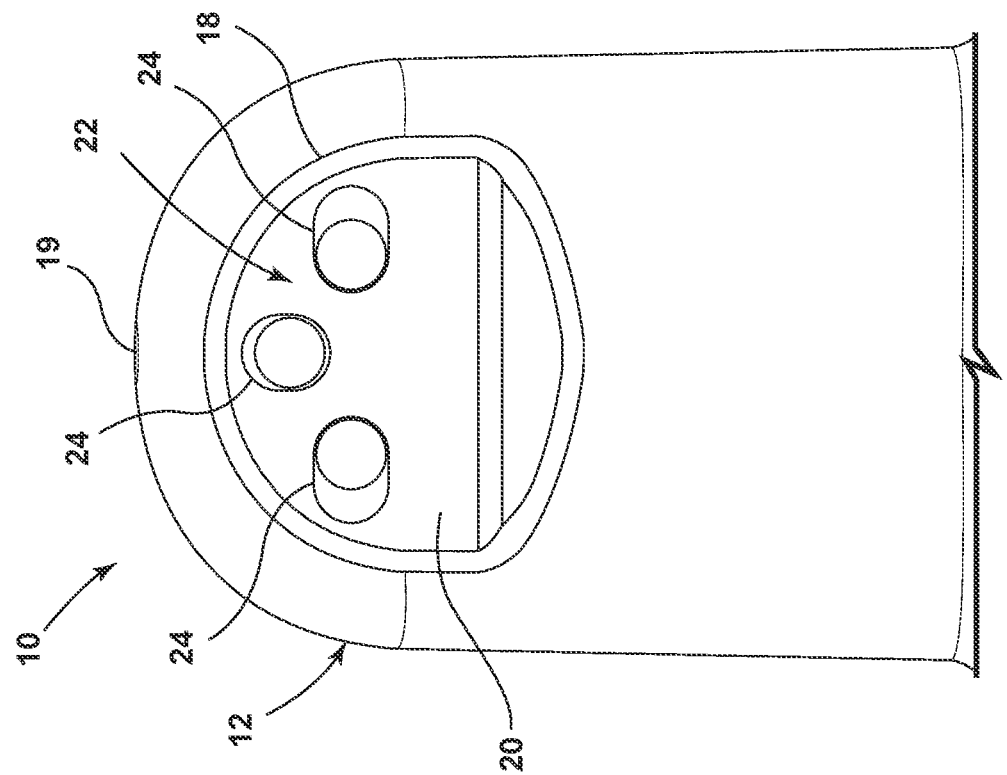

BLENDED JET SPRAY NOZZLE

CROSS REFERENCE TO RELATED APPLICATIONS

This application claims the benefit of U.S. Provisional Application No. 63/324,696, filed Mar. 29, 2022, the disclosure of which is incorporated by reference in its entirety.

FIELD OF THE INVENTION

The disclosure generally relates to spray nozzles and, more specifically, to spray nozzles for cleaning a target such as vehicle external sensors and camera lenses.

BACKGROUND OF THE INVENTION

External view cameras (e.g., front bumper, side-view, rear-view, or backup cameras) as well as external sensors are becoming more commonplace in automotive vehicles to enhance a driver's vision, to improve safety, and to allow for autonomous control of a vehicle. External cameras allow drivers to see obstacles or other objects are in the vicinity of the vehicle, and external sensors provide roadway feedback that may be used to provide a visual or audio cue to the driver or that may be used by an onboard computer to control the driving of the vehicle. However, these external cameras and sensors are exposed to the environment surrounding the vehicle, and often become soiled by dirt, mud, salt spray or other debris which accumulates on the camera lens or sensor, thereby disturbing the normal functioning of these devices.

To combat the accumulation of dirt and debris on camera lenses and sensors, spray nozzles may be provided near the camera lens or sensor. The spray nozzle may eject washer fluid or another similar cleaning fluid on the lens or sensor to remove the built-up debris. Since the spray nozzles may be operated during movement of the vehicle and/or may be operated under high wind conditions, the spray ejected from the nozzles needs to be stable under aerodynamic loads. Also, due to the small size of the camera lenses and sensors, the spray pattern ejected by the nozzles needs to precisely target the lenses and sensors.

BRIEF SUMMARY

An improved spray nozzle for providing a stable and precisely targeted spray pattern is provided. The spray nozzle has a head including a face having a nozzle array and an inner channel in fluid communication with the nozzle array. The nozzle array includes a plurality of nozzles. Each nozzle is defined by an interior opening, an exterior opening, and an outlet channel extending therebetween. Each nozzle has a longitudinal axis extending in a direction extending between the interior opening and the exterior opening. The outlet channel is connected to the inner channel at the interior opening. A cross-sectional shape of the outlet channel taken perpendicular to the longitudinal axis varies from the interior opening to the exterior opening.

In specific embodiments, the interior opening has a stadium shape, and the exterior opening has an elliptical shape.

In specific embodiments, the nozzle array includes three nozzles. In particular embodiments, two of the nozzles are oriented in the same direction, and the third nozzle is rotated 90 degrees relative to the two nozzles. In certain embodiments, the third nozzle is disposed between the two nozzles, and the third nozzle is disposed above the two nozzles. In particular embodiments, one of the nozzles has a smaller cross-sectional area than the other two nozzles. In particular embodiments, the disposition of the nozzles of the nozzle array is symmetrical relative to at least one axis.

In specific embodiments, the head includes an interior surface defining the inner channel, and the interior opening of each nozzle is formed in the interior surface.

In specific embodiments, the face includes a generally flat exterior surface, and the exterior opening of each nozzle is formed in the exterior surface.

In specific embodiments, the nozzle array produces a fluid spray pattern that begins as three independent patterns and converges into a single spray downstream of the nozzle array.

In other embodiments, the spray nozzle has a head including a nozzle array. The nozzle array includes a plurality of nozzles. Each nozzle includes a channel wall defining an outlet channel extending from an interior of the head to an exterior of the head. The channel wall is contoured in a direction from the interior to the exterior such that the geometry of the channel wall varies continuously from the interior to the exterior.

In specific embodiments, a cross-section of the channel wall has a stadium shape adjacent the interior, and a cross-section of the channel wall has an elliptical shape adjacent the exterior.

In specific embodiments, the channel wall is tapered from the exterior to the interior.

In specific embodiments, the cross-sectional area of the outlet channel increases from the interior to the exterior, and the geometry of the channel wall has a smooth transition from the interior to the exterior.

In specific embodiments, the nozzle array includes three nozzles, the shape of two of the nozzles being aligned with each other, and the shape of the third nozzle being rotated 90 degrees relative to the two nozzles.

DESCRIPTION OF THE DRAWINGS

Various advantages and aspects of this disclosure may be understood in view of the following detailed description when considered in connection with the accompanying drawings, wherein:

FIG. 1 shows a front view of a spray nozzle in accordance with some embodiments of the disclosure;

FIG. 2 shows a side cross-sectional view of the spray nozzle of FIG. 1;

DETAILED DESCRIPTION OF THE INVENTION

Figure 4:
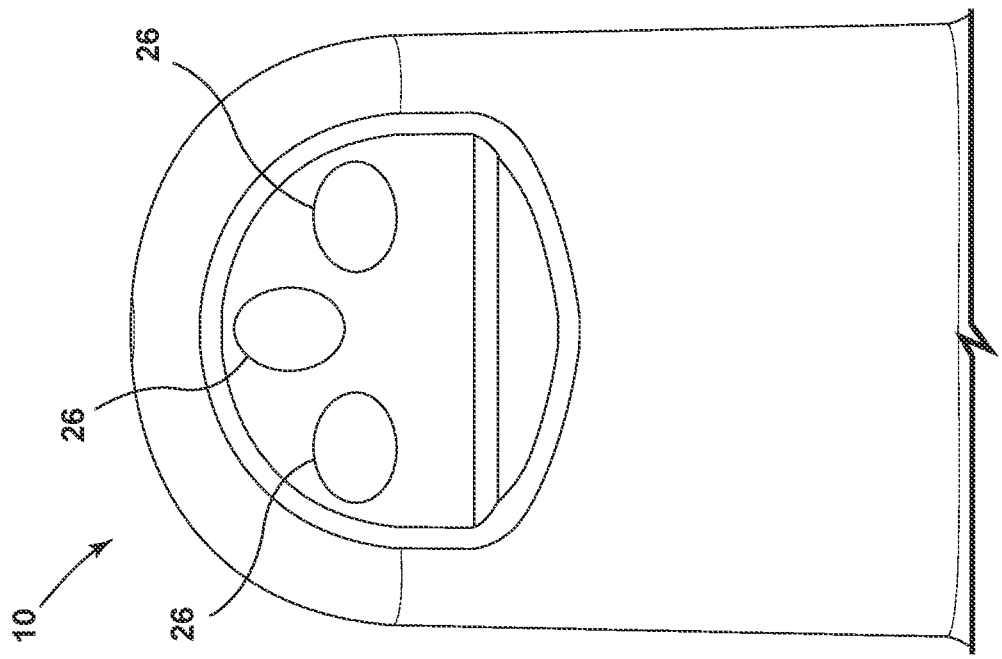
FIG. 4 shows a front view of an exterior opening of the spray nozzle of FIG. 1.

An improved spray nozzle for automotive vehicles is provided. Referring to FIGS. 1-6, wherein like numerals indicate corresponding parts throughout the several views, the spray nozzle is illustrated and generally designated at 10. Certain features of the spray nozzle 10 are functional, but can be implemented in different aesthetic configurations.

The spray nozzle 10 includes a head 12. The head 12 may be generally tubular in shape, such that the head is elongated and has a length longer than its diameter. The head 12 may be integrally form of a single piece. i.e. monolithic in construction. The head 12 has an interior surface 14 defining an inner channel 16. The inner channel 16 forms a fluid pathway for washer fluid or other similar cleaning liquid delivered to the spay nozzle from a fluid reservoir (not shown). The head 12 includes a face 18 disposed near its terminal, tip end 19. The face 18 has a generally flat, exterior surface 20 containing a nozzle array 22. Particularly, the nozzle array 22 includes a plurality of nozzles 24 that are each defined by an exterior opening 26, an interior opening 28, and an outlet channel 30 extending between the exterior opening and the interior opening. The exterior opening 26 is formed in the exterior surface 20 of the face 18, and the interior opening 28 is formed in the interior surface 14 of the head 12. The outlet channel 30 of each nozzle 24 is defined by a channel wall 32 and is connected to the inner channel 16 of the head 12 are the interior opening 28.

Figure 3:
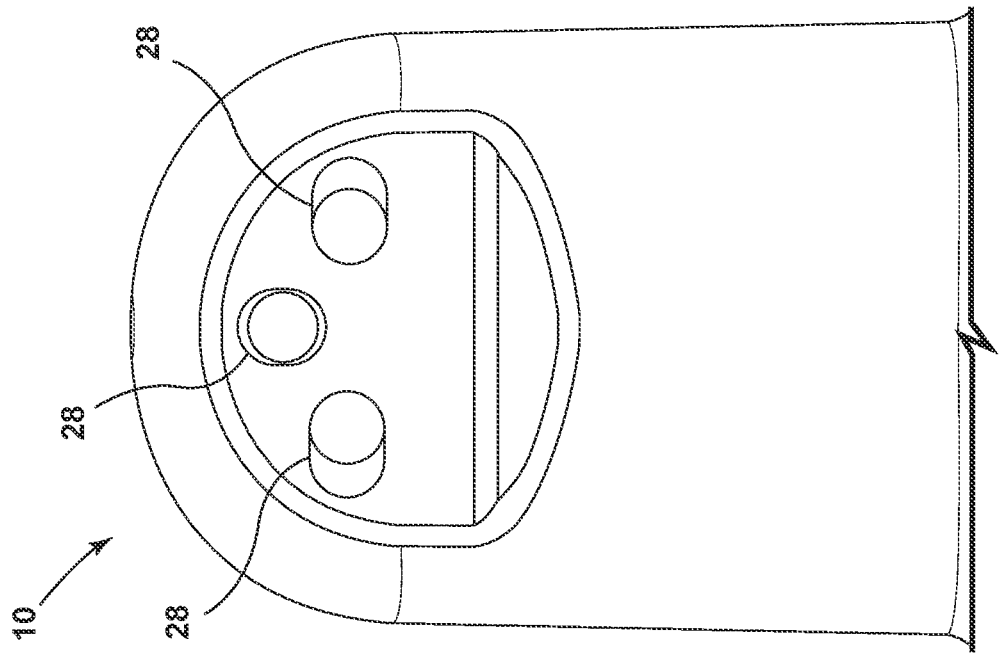
FIG. 3 shows a front view of an interior opening of the spray nozzle of FIG. 1.

Each nozzle 24 has a longitudinal axis 34 extending through the center of the outlet channel 30 of the nozzle in a direction between the interior opening 28 and the exterior opening 26. As shown in FIGS. 2 through 4, a cross-sectional shape of the outlet channel 30 taken perpendicular to the longitudinal axis 34 varies from the interior opening 28 to the exterior opening 26. In other words, the geometrical shape of the channel wall 32 of the outlet channel varies and the channel wall is smoothly contoured in a direction from the interior opening to the exterior opening. In certain embodiments, the interior opening 28 has a stadium shape, i.e. the cross-section of the outlet channel at the interior opening is a stadium shape as shown in FIG. 3. A "stadium" shape has its standard dictionary geometrical definition and is a geometrical shape that is a rectangle in which two opposite sides are replaced with semicircles such that the rectangle has two opposite semi-circle ends, with the other two opposite sides being straight lines between the semi-circle ends. In these embodiments, the exterior opening 26 has an elliptical shape as shown in FIG. 4, and the channel wall 32 of the outlet channel 30 smoothly transitions from a stadium shape to an elliptical shape from the interior opening 28 to the exterior opening 26. In other words, the channel wall is tapered from the exterior opening 26 to the interior opening 28, such that the cross-sectional area of the outlet channel continually decreases from the interior opening to the exterior opening and oppositely continually increases from the exterior opening to the interior opening.

In certain embodiments, the nozzle array 22 includes three nozzles 24. Two of the nozzles are oriented in the same direction, and the third nozzle is rotated 90 degrees relative to the two nozzles. In other words, the geometrical shape of two of the nozzles are aligned with and parallel to each other such that if one of the nozzles were moved to overlap the other nozzle, the shape of the nozzles would match each other, while the shape of the third nozzle is rotated 90 degrees. The third nozzle that is rotated 90 degrees relative to the other two nozzles is disposed between the two nozzles. This third nozzle is also disposed above the other two nozzles, such that it is disposed closer to the tip end 19 of the head 12. Further, this third nozzle may have a smaller cross-sectional area than the other two nozzles. In other words, the third nozzle has the same shape as the other two nozzles, but may be smaller than the other two nozzles. Additionally, the two nozzles may be equidistant from the third nozzle (on either side) such that the disposition of the nozzles is symmetrical relative to an axis that runs through the center of the third nozzle.

Figure 5:
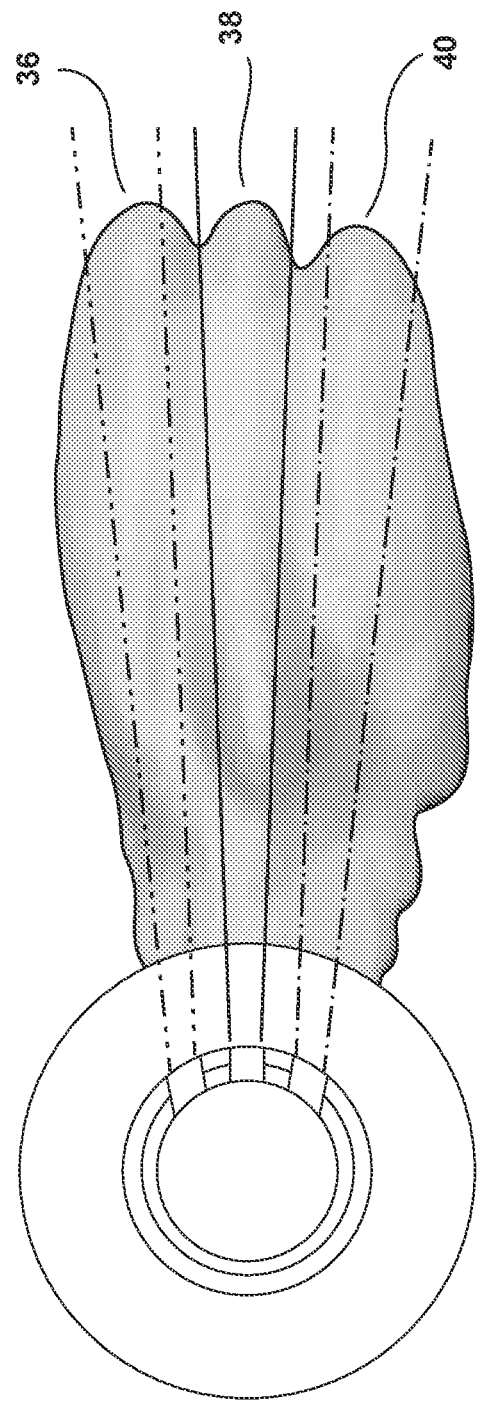
FIG. 5 shows a schematic view of independent spray patterns ejected from the spray nozzle of FIG. 1.
Figure 6:
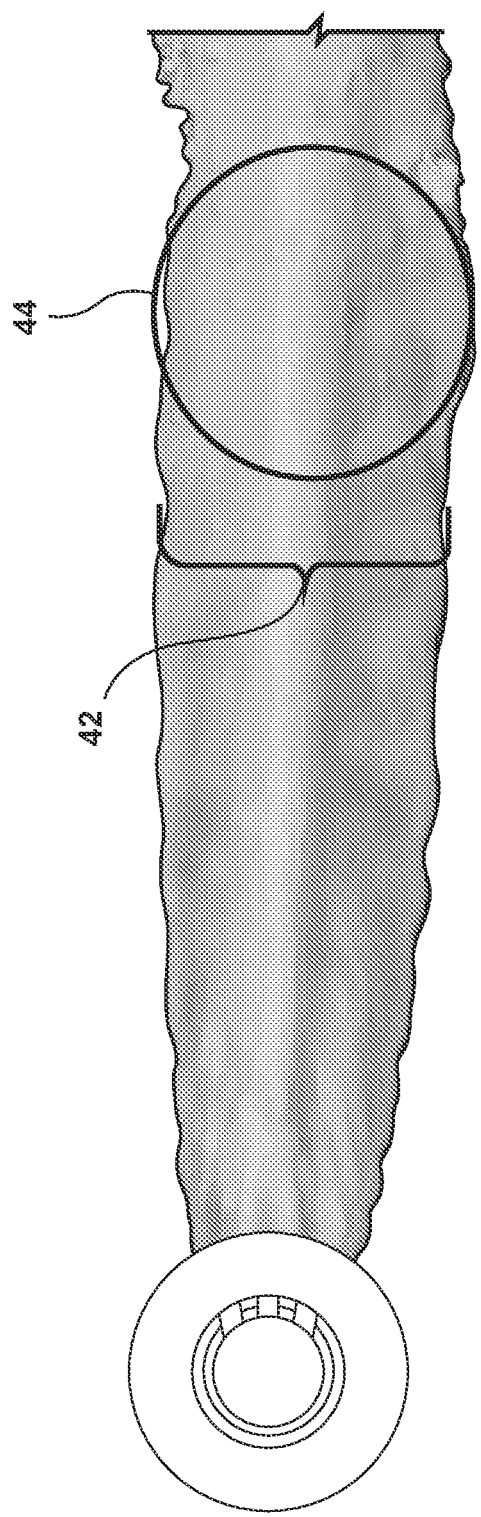
FIG. 6 shows a schematic view of the independent spray patterns converging into a single spray pattern at a target.

A system for cleaning vehicle camera lenses and sensors may include the spray nozzle 10. The system generally includes a fluid reservoir, a supply line, and a fluid pump for pumping fluid from the reservoir into the supply line and for generating fluid pressure in the supply line. Fluid delivered to the nozzle head 12 from the supply line travels through the inner channel 16 and is communicated to the nozzle array 22 through the interior openings 28 of the nozzles 24. When a sufficient fluid pressure is exerted, fluid is ejected from the nozzles 24. Due to the dimensions and arrangement of the nozzles 24 of the nozzle array 22, the fluid spray pattern of the fluid ejected from the nozzles 24 begins (at and near the exterior openings 26) as three independent patterns such as but not limited to jet/point patterns 36, 38, 40 as shown in FIG. 5. The tapered outlet channels 30 provide that a certain distance downstream of the nozzle array (at a distance from the exterior openings 26), the three independent spray patterns converge into a single spray 42 as shown in FIG. 6. The spray nozzle 10 is spaced from a camera lens, sensor or other target 44 at a distance such that the spray pattern converges in the vicinity of where the target is positioned. Merging the spray patterns into one pattern allows the patter to completely cover the surface of a target (e.g., camera lens, sensor, etc.) that needs to be cleaned. At the same time, keeping the spay patterns independent prior to reaching the cleaning target area allows the spray patterns to have more energy to overcome any aerodynamic loads including air flow around the body of the vehicle during movement as well as wind.

In general, materials suitable for use in or as the spray nozzle 10 include metals (e.g. steels, aluminums, alloys, etc.), resins (e.g. thermoset and/or thermoplastic resins), rubbers/elastomers, and combinations thereof. However, myriad materials may be used to manufacture the elements of the spray nozzle 10, each typically selected as a function of availability, cost, performance/end use applications, etc. Moreover, metals, metal alloys, rubbers/elastomers, and resins are not exhaustive of suitable materials that may be used.

In certain embodiments, spray nozzle 10 comprises a resin, such as a thermoplastic and/or thermoset resin. Examples of suitable resins typically comprise the reaction product of a monomer and a curing agent, although resins formed of self-polymerizing monomers (i.e., those acting as both a monomer and a curing agent) may also be utilized. It is to be appreciated that such resins are conventionally named/identified according to a particular functional group present in the reaction product. For example, the term "polyurethane resin" represents a polymeric compound comprising a reaction product of an isocyanate (i.e., a monomer) and a polyol (i.e., a chain extender/curing agent). The reaction of the isocyanate and the polyol create urethane functional groups, which were not present in either of the unreacted monomer or curing agent. However, it is also to be appreciated that, in certain instances, resins are named according to a particular functional group present in the monomer (i.e., a cure site). For example, the term "epoxy resin" represents a polymeric compound comprising a cross-linked reaction product of a monomer having one or more epoxide groups (i.e., an epoxide) and a curing agent. However, once cured, the epoxy resin is no longer an epoxy, or no longer includes epoxide groups, but for any unreacted or residual epoxide groups (i.e., cure sites), which may remain after curing, as understood in the art. In other instances, however, resins may be named according to a functional group present in both the monomer and the reaction product (i.e., an unreacted functional group).

In some embodiments, the various components of the spray nozzle 10 comprise material suitable for use under continuous exposure to temperatures of from −40° C. to 120° C., or from−40° C. to 135° C. and/or pressures of from 0.5 to 2 bar. In certain embodiments, spray nozzle 10 comprises materials that can withstand up to 30 minutes, alternatively more than 30 minutes, of exposure to temperatures of up to 150° C. without irreversible harmful effects (e.g. melting, etc.).

With regard to composition of the spray nozzle 10 described above comprising a resin, examples of suitable resins include thermoset resins and thermoplastic resins. Examples of suitable thermoset and/or thermoplastic resins typically include polyamides (PA), such as Nylons; polyesters such as polyethylene terephthalates (PET), polybutylene terephthalates (PET), polytrimethylene terephthalates (PTT), polyethylene naphthalates (PEN), liquid crystalline polyesters, and the like; polyolefins such as polyethylenes (PE), polypropylenes (PP), polybutylenes, and the like; styrenic resins; polyoxymethylenes (POM); polycarbonates (PC); polymethylenemethacrylates (PMMA); polyvinyl chlorides (PVC); polyphenylene sulfides (PPS); polyphenylene ethers (PPE); polyimides (PI); polyamideimides (PAI); polyetherimides (PEI); polysulfones (PSU); polyethersulfones; polyketones (PK); polyetherketones (PEK); polyetheretherketones (PEEK); polyetherketoneketones (PEKK); polyarylates (PAR); polyethernitriles (PEN); resol-type; urea (e.g. melamine-type); phenoxy resins; fluorinated resins, such as polytetrafluoroethylenes; thermoplastic elastomers, such as polystyrene types, polyolefin types, polyurethane types, polyester types, polyamide types, polybutadiene types, polyisoprene types, fluoro types, and the like; and copolymers, modifications, and combinations thereof.

With regard to composition of the spray nozzle 10 described above comprising a rubber/elastomer, examples of suitable rubber/elastomers include neoprene rubbers, buna-N rubbers, silicone rubbers, ethylene propylene diene monomer (EPDM) rubbers, natural gum rubbers, viton rubbers, natural latex rubbers, vinyl rubbers, santoprene rubbers, epichlorohydrin (ECH) rubbers, butyl rubbers, latex-free thermoplastic elastomer (TPEs), thermoplastic elastomers, hypalon rubbers, ethylene propylene rubbers, fluoroelastomer rubbers, fluorosilicone rubbers, hydrogenated nitrile rubbers, nitrile rubbers, perfluoroelastomer rubbers, polyacrylic rubbers, polychloroprenes, polyurethanes, aflas rubbers (e.g. TFE/Ps), chlorosulfonated polyethelene rubbers, styrene butadiene rubbers (SBRs), polyacrylates, ethylene acrylic rubbers, polyvinyl chloride (PVC), ethylene-vinyl acetate (EVA), and combinations thereof.

In various embodiments, the spray nozzle 10 described above may comprise a material (e.g. a resin, rubber, etc.) including a filler. Examples of suitable fillers include reinforcing fillers added for providing mechanical strength, such as inorganic fillers (e.g. fumed silica fine powder, precipitated silica fine powder, fused silica fined powder, baked silica fine powder, fumed titanium dioxide fine powder, quartz fine powder, calcium carbonate fine powder, diatomaceous earth fine powder, aluminum oxide fine powder, aluminum hydroxide powder, zinc oxide fine powder, zinc carbonate fine powder, glass fibers, etc.), organic fibers (e.g. carbon fibers), natural fibers, and the like, as well as combinations thereof. In some embodiments, at least one component of the quick connector assembly 20 comprises a fiberglass.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention claimed is:

1. A spray nozzle comprising:
a head;
the head including a face having a nozzle array, and an inner channel in fluid communication with the nozzle array;
the nozzle array including a plurality of nozzles;
each nozzle being defined by an interior opening having a stadium shape, at least one exterior opening having an elliptical shape, and an outlet channel extending therebetween;
each nozzle having a longitudinal axis extending in a direction extending between the interior opening and the exterior opening, the outlet channel being connected to the inner channel at the interior opening;
wherein a cross-sectional shape of the outlet channel taken perpendicular to the longitudinal axis varies from the interior opening to the exterior opening in at least one of the plurality of nozzles, such that the cross-sectional shape of the outlet channel continuously transitions from the stadium shape at the interior opening to the elliptical shape at the exterior opening.

2. The spray nozzle of claim 1, wherein the nozzle array includes three nozzles.

3. The spray nozzle of claim 2, wherein two of the nozzles are oriented in the same direction, and the third nozzle is rotated 90 degrees relative to the two nozzles.

4. The spray nozzle of claim 3, wherein the third nozzle is disposed between the two nozzles.

5. The spray nozzle of claim 3, wherein the third nozzle is disposed above the two nozzles.

6. The spray nozzle of claim 2, wherein one of the nozzles has a smaller cross-sectional area than the other two nozzles.

7. The spray nozzle of claim 2, wherein the disposition of the nozzles of the nozzle array is symmetrical relative to at least one axis.

8. The spray nozzle of claim 1, wherein the head includes an interior surface defining the inner channel, and the interior opening of each nozzle is formed in the interior surface.

9. The spray nozzle of claim 1, wherein the face includes a generally flat exterior surface, and the exterior opening of each nozzle is formed in the exterior surface.

10. The spray nozzle of claim 1, wherein the nozzle array produces a fluid spray pattern that begins as three independent patterns and converges into a single spray downstream of the nozzle array.

11. A spray nozzle comprising:

a head including a nozzle array, the nozzle array including a plurality of nozzles;

each nozzle including a channel wall defining an outlet channel extending from an interior of the head to an exterior of the head;

wherein the channel wall is contoured in a direction from the interior to the exterior such that the geometry of the channel wall varies continuously from the interior to the exterior;

wherein a cross-section of the channel wall has a stadium shape adjacent the interior, and a cross-section of the channel wall has an elliptical shape adjacent the exterior;

wherein the channel wall is tapered from the exterior to the interior such that the cross-sectional area of the outlet channel continually increases from the interior to the exterior, and the cross-section of the channel wall transitions from the stadium shape at the interior to the elliptical shape at the exterior.

12. The spray nozzle of claim 11, wherein the nozzle array includes three nozzles, the shape of two of the nozzles being aligned with each other, and the shape of the third nozzle being rotated 90 degrees relative to the two nozzles.

\* \* \* \* \*